Aug. 28, 1934.   R. HITCHCOCK   1,971,716
ASH REMOVER
Filed June 26, 1930

INVENTOR,
Reuben Hitchcock,
BY Howard D. Smith
ATTORNEY

Patented Aug. 28, 1934

1,971,716

UNITED STATES PATENT OFFICE 1,971,716

ASH REMOVER

Reuben Hitchcock, Cleveland, Ohio, assignor, by mesne assignments, to The Reliance Electric and Engineering Company, Cleveland, Ohio, a corporation of Ohio Application June 26, 1930, Serial No. 463,887

5 Claims. (Cl. 110—165)

This invention relates to new and useful improvements in ash removers and more particularly to means for removing ashes from beneath the grates of small furnaces and boilers.

It is the principal object of my invention to provide a simple and efficient device for removing ashes from the pits of domestic furnaces and boilers.

Figure 2:
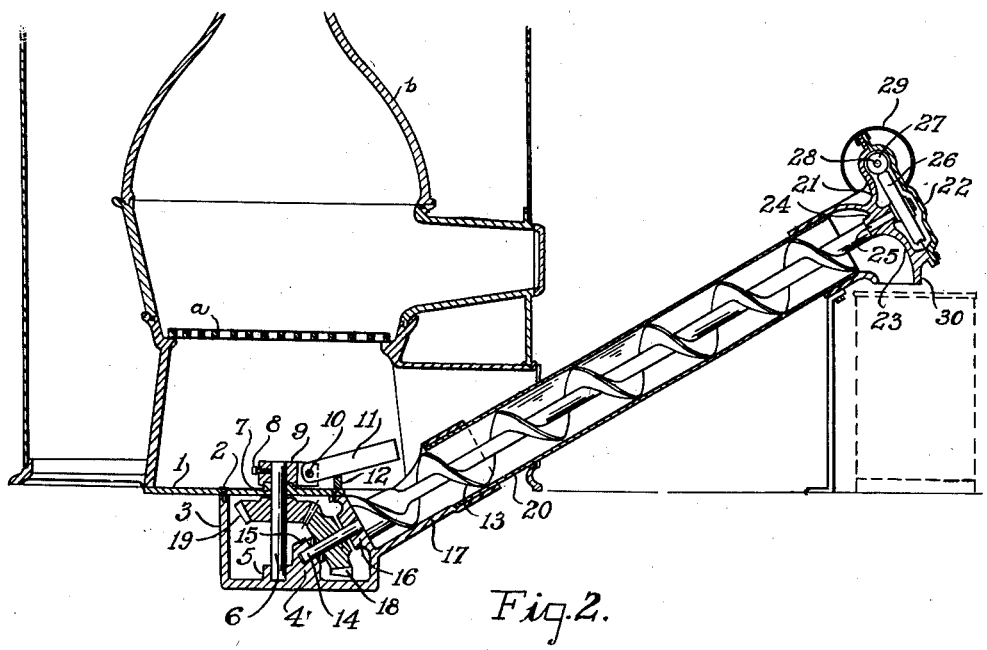
Figure 1:
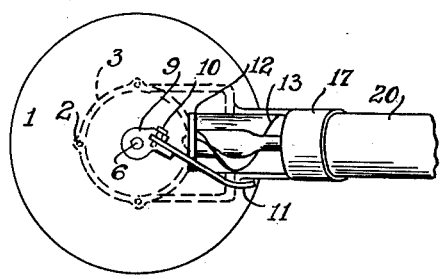
Figure 3:
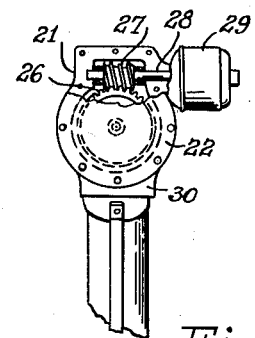

In the accompanying drawing illustrating my invention, Figure 1 is a top plan view of my ash remover. Figure 2 is a sectional view taken through the gear box, ash discharge tube and drive mechanism. And Figure 3 is an end view of the conveyor worm drive mechanism.

Referring to the accompanying drawing for a detailed description of my invention, the numeral 1 designates a fixed ash receiving plate at the bottom of a pit beneath the grates a of a small domestic furnace b. Secured to the under surface of the central portion of the plate 1 by screws 2, is a gear box 3. In the bottom of the latter is an integral double bearing 4. The latter is formed with an offset narrow base portion 5 having a vertical hole to receive the lower end of a vertical shaft 6 which projects upwardly through a hole in a boss 7 integral with the middle portion of the plate 1.

Fitted to the upper end of the shaft 6 and fixedly secured thereto by a set screw 8, is a radial member 9 that is formed with an annular depression in its bottom portion to clear the boss 7. To this radial member 9 there is secured by a cap screw 10, or other pivotal means, a wiper arm 11 which is adapted to be raised by a cam 12, on the plate 1, to clear a worm conveyor 13 upon which it sweeps ashes during its rotation over the plate.

The ash conveyor worm 13 is but a single member, having a lower shaft extension 14 that is received by an inclined hole in the vertical part 15 of the bearing 4. This shaft 14 also passes through an inclined wall 16 of the gear box 3 from which a tubular extension 17 inclines upwardly to receive the lower end of the worm.

Fixed on the worm shaft 14 within the gear box 3 is a bevel gear 18 which meshes with a horizontal bevel gear 19 fast on the vertical shaft 6 within the gear box. The vertical shaft 6 is thus driven by the conveyor 13 when the latter is rotated by means soon to be described.

Fitted in the enlarged end of the tubular extension 17 is a tube 20 through which the worm 13 projects. Secured to the rear end of the tube 20 is a gear casing 21 to which an end plate 22 is removably attached.

Supported by a web disc 23 within the casing 21 is a bearing 24 for an outer shaft extension 25 on the worm 13. Fixed on the outer end of the shaft 25 is a worm gear 26 that meshes with a worm 27 mounted on the armature shaft 28 of an electric motor 29.

When the motor is operated, the worm conveyor 13 will be turned to convey to the rear the ashes scraped upon it by the wiper arm 11 which is rotated by the gear connection between the worm shaft 14 and the vertical shaft 6. These ashes are then discharged through an outlet 30 in the bottom of the casing 21, into a suitable receptacle.

The cam 12 is a wedge shaped member secured to the plate 1 in such a position that it will start to raise the hinged wiper member 11 a short time before it reaches the conveyor worm 13. The plate 1 and the tubular extension 17 of the gear box 3 are open at the place where the wiper member 11 passes over the latter, to receive the ashes swept upon it by the wiper member.

The hinged wiper member 11 will not only clear the worm conveyor 13 and deposit the ash upon it while so doing, but is free to rise above any obstacle that may be in its path of travel after it has again fallen down upon the plate.

Having described my invention, I claim:

1. In a device of the type described, an ash pit plate, a conveyor tube projecting therefrom, a conveyor in said tube, a vertical shaft rotatably supported adjacent the center of said plate, a member fixed to said shaft, and a wiper arm pivotally connected to said member and rotatable upon the plate, said latter and the conveyor tube being open to expose the conveyor at a place below the path of travel of the wiper arm, whereby ashes may be swept upon the conveyor by the wiper arm.

2. In a device of the type described an ash pit plate, a conveyor tube inclining therefrom, a conveyor in said tube, a hinged wiper member rotatable upon said plate, the latter and the conveyor tube being open to expose the conveyor at a place below the path of travel of the wiper member, and means for raising the hinged wiper member while it is passing over said openings.

3. In a device of the type described, a stationary ash pit plate, a conveyor tube therefrom, a conveyor in said tube, a hinged wiper member rotatable upon said plate, the latter and the conveyor tube being open to expose the worm conveyor at a place below the path of travel of the wiper member, and a cam on said plate for raising the hinged wiper member while it is passing over said openings.

4. In a device of the type described, a stationary ash pit plate, a conveyor tube projecting therefrom, a conveyor in said tube, a member rotatably supported adjacent the center of said plate, a wiper arm on said member, means for actuating said conveyor, and a gear connection between said conveyor and arm to revolve the latter when the conveyor is in operation, said plate and conveyor tube being open to expose the conveyor at a place below the travel of the wiper arm, whereby ashes may be swept upon the conveyor by said wiper arm.

5. In a device of the type described an ash pit plate, a gear box below the central portion of the latter, a shaft journaled in said box and projecting upwardly through said plate, a member secured to said shaft, a wiper arm hingedly secured to the member, a conveyor tube extending outwardly from said gear box, a conveyor in said tube, gearing in said gear box whereby said shaft is driven from said conveyor, means for actuating the conveyor, the plate and conveyor tube being open to expose the conveyor at a place below the path of travel of the wiper member, and a cam on said plate for raising the hinged wiper member while it is passing over said openings.

REUBEN HITCHCOCK.